(12) United States Patent
Grehn et al.

(10) Patent No.: US 10,761,352 B1
(45) Date of Patent: Sep. 1, 2020

(54) OPTICAL DEVICE

(71) Applicant: Sicoya GmbH, Berlin (DE)

(72) Inventors: Moritz Grehn, Berlin (DE); Thorsten Kettler, Berlin (DE); Gan Zhou, Berlin (DE); Marco Vitali, Berlin (DE)

(73) Assignee: SICOYA GMBH, Berlin (DE)

( * ) Notice: Subject to any disclaimer, the term of this patent is extended or adjusted under 35 U.S.C. 154(b) by 0 days.

(21) Appl. No.: 16/568,061

(22) Filed: Sep. 11, 2019

(51) Int. Cl.
 *G02F 1/01* (2006.01)
(52) U.S. Cl.
 CPC ............ *G02F 1/0147* (2013.01); *G02F 1/011* (2013.01); *G02F 2201/58* (2013.01); *G02F 2203/50* (2013.01)
(58) Field of Classification Search
 None
 See application file for complete search history.

(56) References Cited

U.S. PATENT DOCUMENTS

| 6,643,431 B2 | 11/2003 | Hatayama et al. |
| 2003/0053788 A1 | 3/2003 | Lee et al. |
| 2016/0072586 A1* | 3/2016 | Hochberg ............ H04B 10/40 398/136 |
| 2017/0285373 A1* | 10/2017 | Zhang ................ G02B 6/29344 |
| 2018/0059332 A1* | 3/2018 | Mansouri Rad ... G02B 6/12004 |

FOREIGN PATENT DOCUMENTS

| JP | 2002267862 A | 9/2002 |
| KR | 1020010099192 A | 11/2001 |

OTHER PUBLICATIONS

Wim Bogaerts, et al., "A polarization-diversity wavelength duplexer circuit in silicon-on-insulator photonics wires"; Optics Express; vol. 15; No. 4; Feb. 19, 2007; pp. 1567-1578.

* cited by examiner

*Primary Examiner* — Chad H Smith
(74) *Attorney, Agent, or Firm* — Gordon Rees Scully Mansukhani, LLP

(57) ABSTRACT

The invention relates to optical devices comprising polarization diversity couplers.
An embodiment of the invention relates to an optical device comprising a polarization diversity coupler configured to receive a beam of optical radiation. The optical device may further comprise a phase shifter, a 2×N coupler, a photodetector and a control unit configured to generate a control signal based on a monitor signal of the photodetector.

16 Claims, 9 Drawing Sheets

OPTICAL DEVICE

The invention relates to optical devices comprising polarization diversity couplers.

BACKGROUND OF THE INVENTION

An optical device comprising a polarization diversity coupler is described in "A polarization-diversity wavelength duplexer circuit in silicon-on-insulator photonics wires" (W. Bogaerts et al., Vol. 15, No. 4, Optics Express 1568). This optical device achieves polarization insensitive operation through a polarization diversity approach in which 2-D grating fiber couplers are used as integrated polarization splitters.

OBJECTIVE OF THE PRESENT INVENTION

An objective of the present invention is to provide an optical device that is capable of efficiently receiving and processing incoming radiation of arbitrary polarization.

BRIEF SUMMARY OF THE INVENTION

The present invention relates to an optical device comprising
- a polarization diversity coupler configured to receive a beam of optical radiation having a first polarization, a second polarization perpendicular to the first polarization or a mixture of both the first and second polarization, the polarization diversity coupler comprising a first output port for outputting a first portion of the optical radiation that featured the first polarization in said beam of optical radiation, and a second output port for outputting a second portion of the optical radiation that featured the second polarization in said beam of optical radiation,
- a first waveguide connected to the first output port of the polarization diversity coupler and configured to receive the first portion of the optical radiation and guide the first portion in a waveguide mode provided by the first waveguide,
- a second waveguide that provides the same waveguide mode as the first waveguide, wherein the second waveguide is connected to the second output port of the polarization diversity coupler and configured to receive the second portion of the optical radiation and guide the second portion in said same waveguide mode,
- a first phase shifter arranged in the first waveguide and configured to induce a phase shift in the first waveguide in response to a first control signal,
- a 2×N coupler having a first input port connected to the first waveguide, a second input port connected to the second waveguide and two or more output ports,
- a first photodetector configured to detect at least a portion of the radiation that passes the 2×N coupler, and to generate a first monitor signal that indicates the amount of the detected radiation, and
- a control unit configured to generate the first control signal based on the first monitor signal.

In an exemplary embodiment, the 2×N coupler comprises N output ports, each of which is connected to an individually assigned output waveguide, and a plurality of photodetectors, one which is said first photodetector,
    wherein each of the photodetectors is individually assigned to one of the output waveguides,
    wherein each of the photodetectors is configured to detect at least a portion of the radiation that is guided in its individually assigned output waveguide,
    wherein each of the photodetectors is configured to generate a monitor signal indicating the amount of the detected radiation, and
    wherein the control unit is configured to generate the first control signal based on the monitor signals of said N photodetectors.

The control unit may be configured to generate the first control signal such that it yields monitor signals meeting at least one condition, wherein the at least one condition may include the requirement that the radiation guided in the N output waveguides is equal or at least equal within a given tolerance.

Further, each of the output ports of the 2×N coupler may be connected to an assigned output port of the optical device via an output path.

At least one modulator may be located in each output path, wherein each modulator may be configured to modulate the radiation in its respective output path in response to an electrical data signal that is applied to the modulator and may comprise a data stream.

The optical device may comprise a beam deflecting element in each output path.

The beam deflecting elements, the polarization diversity coupler, the phase shifter, the 2×N coupler, and the modulators are preferably located in the same plane.

The beam received by the polarization diversity coupler may be angled relative to said plane.

The polarization diversity coupler element is preferably configured to deflect the beam into the plane towards the 2×N coupler.

Each beam deflecting element is preferably configured to deflect the modulated radiation off the plane towards the assigned output port of the optical device. Alternatively, the beam deflecting elements may itself form the output ports of the optical device.

In another exemplary embodiment, the 2×N coupler is a 2×2 coupler comprising a first output port and a second output port.

The first output port of the 2×2 coupler is preferably connected to a first output waveguide, and the second output port of the 2×2 coupler is preferably connected to a second output waveguide.

The first photodetector is preferably assigned to the first output waveguide and configured to detect at least a portion of the radiation that is guided in the first output waveguide, and to generate a first monitor signal indicating the amount of the detected radiation.

The control unit is preferably configured to generate the first control signal such that it yields a first monitor signal meeting at least one condition.

The at least one condition may include the requirement that the amplitude of the first monitor signal equals half, or at least half within a given tolerance, of the maximum amplitude that the first monitor signal could adopt in response to an appropriate control signal.

The optical device may further comprise a second photodetector.

The second photodetector is preferably assigned to the second output waveguide and configured to detect at least a portion of the radiation that is guided in the second output waveguide, and to generate a second monitor signal indicating the amount of the detected radiation.

The control unit is preferably configured to generate the first control signal based on the first and second monitor signal.

The control unit may be configured to generate the first control signal such that it yields monitor signals meeting at least one condition, wherein the at least one condition may include the requirement that the difference between the amplitudes of the two monitor signals is minimal, or zero within a given tolerance.

In yet another exemplary embodiment, a second phase shifter may be arranged in the second waveguide and configured to induce a phase shift in the second waveguide in response to a second control signal.

The control unit may be configured to generate the first and second control signal based on the first monitor signal, the second monitor signal, or both the first and second monitor signal.

In yet another exemplary embodiment, the 2×N coupler is a first 2×2 coupler having a first and a second output port, wherein the first output port of the first 2×2 coupler is connected to a first input port of a second 2×2 coupler via a third waveguide, and wherein the second output port of the first 2×2 coupler is connected to a second input port of a second 2×2 coupler via a fourth waveguide.

A first intermediate phase shifter may be arranged in the third waveguide and configured to induce a phase shift in the third waveguide in response to a first intermediate control signal.

The first photodetector is preferably configured to detect at least a portion of the radiation that also passes the second 2×2 coupler.

The control unit is preferably configured to generate the first control signal and the first intermediate control signal based on the first monitor signal.

The control unit is preferably configured to generate the first control signal and the first intermediate control signal such that they yield a first monitor signal meeting at least one condition, wherein the at least one condition may include the requirement that the radiation outputted at a first output port of the second 2×2 coupler is minimal or zero within a given tolerance.

A second output port of the second 2×2 coupler is preferably connected to an output port of the optical device.

The optical device may comprise a modulator located between the second output port of the second 2×2 coupler and the output port of the optical device.

The modulator may be configured to modulate the radiation that it receives from the second output port of the second 2×2 coupler, in response to an electrical data signal that is applied to the modulator and may comprise a data stream.

The optical device may further comprise a beam deflecting element between the modulator and the output port of the optical device.

The beam deflecting element, the polarization diversity coupler, the phase shifter, the couplers, and the modulator are preferably located in the same plane.

The beam received by the polarization diversity coupler may be angled relative to said plane. Said polarization diversity coupler is preferably configured to deflect the beam into the plane towards the first 2×2 coupler.

The beam deflecting element is preferably configured to deflect the modulated radiation off the plane towards the output port of the optical device. Alternatively, the beam deflecting element may itself form the output port of the optical device.

In any of the exemplary embodiments described above, the 2×N couplers may be MMI couplers.

In any of the exemplary embodiments described above, the 2×2 couplers may be 3 dB-MMI couplers.

In any of the exemplary embodiments described above, the 2×N or 2×2 couplers may be directional couplers.

In any of the exemplary embodiments described above, the first and/or second phase shifter may be a thermo-optical phase shifter having a heater that comprises or consists of metal.

In any of the exemplary embodiments described above, the first and/or second phase shifter may be a thermo-optical phase shifter having a heater that comprises or consists of doped semiconductor material.

BRIEF DESCRIPTION OF THE DRAWINGS

In order that the manner in which the above-recited and other advantages of the invention are obtained will be readily understood, a more particular description of the invention briefly described above will be rendered by reference to specific embodiments thereof which are illustrated in the appended drawings. Understanding that these drawings depict only typical embodiments of the invention and are therefore not to be considered to be limiting of its scope, the invention will be described and explained with additional specificity and detail by the use of the accompanying drawings in which.

DETAILED DESCRIPTION OF THE PREFERRED EMBODIMENTS

The preferred embodiments of the present invention will be best understood by reference to the drawings. It will be readily understood that the present invention, as generally described and illustrated in the figures herein, could vary in a wide range. Thus, the following more detailed description of the exemplary embodiments of the present invention, as represented in the figures, is not intended to limit the scope of the invention, as claimed, but is merely representative of presently preferred embodiments of the invention.

Figure 1:
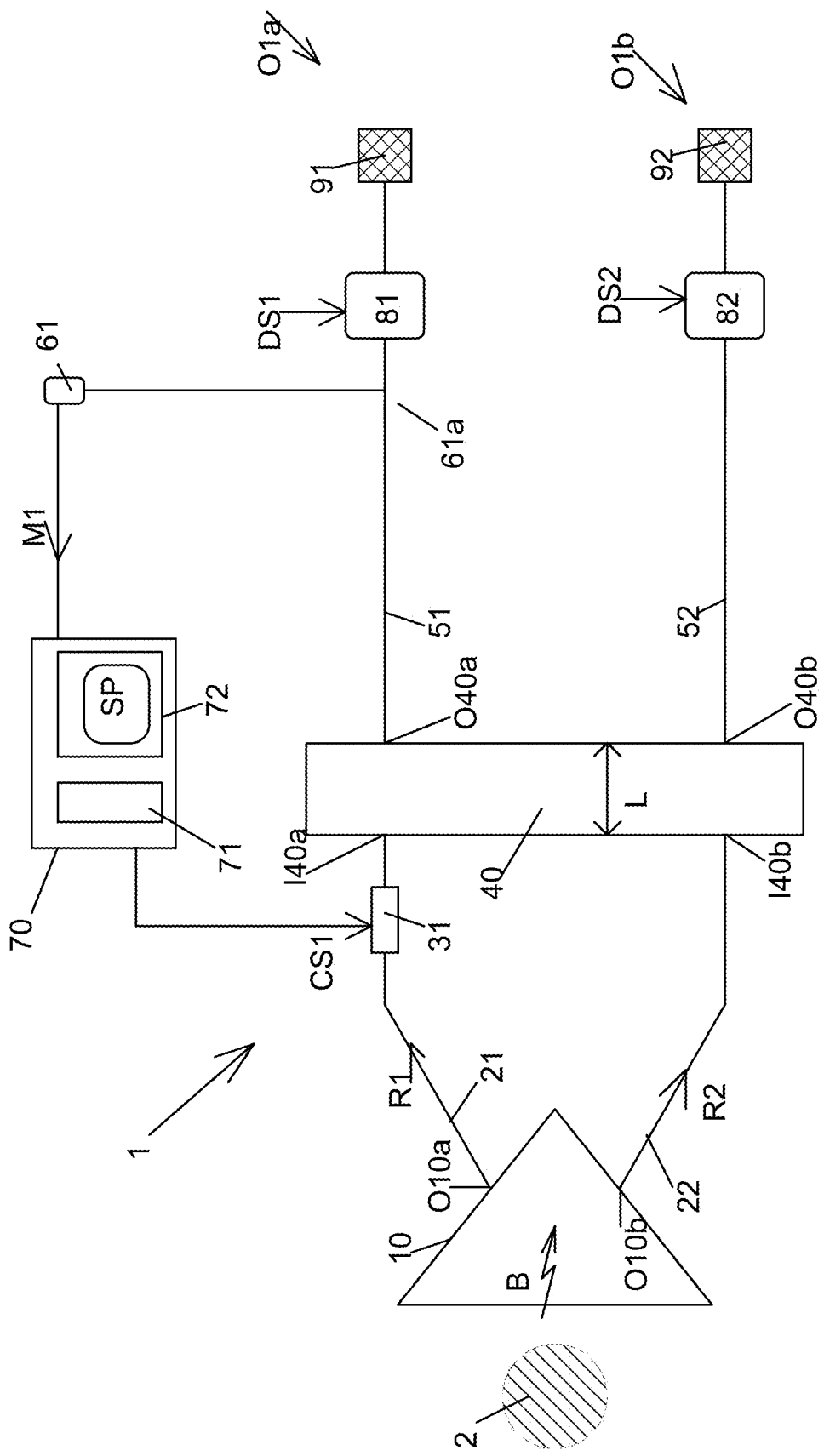
FIG. 1-5 illustrate exemplary embodiments of optical devices comprising a single coupler.

FIG. 1 shows a first exemplary embodiment of an optical device 1 according to the present invention.

The optical device 1 comprises a polarization diversity coupler 10 that receives a beam B of optical radiation. The beam B may have arbitrary polarization, i.e. a first polarization (e.g. TE polarization), a second polarization (e.g. TM polarization) perpendicular to the first polarization or a mixture of both the first and second polarization (e.g. TE and TM polarization). The beam may be directed towards the polarization diversity coupler 10 by an external fiber 2 that may be not polarization maintaining such that the actual polarization of the incoming beam B is unknown.

The polarization diversity coupler 10 comprises a first output port O10a for outputting a first portion R1 of the optical radiation that featured the first polarization in the beam B of optical radiation. The polarization diversity coupler 10 further comprises a second output port O10b for outputting a second portion R2 of the optical radiation that featured the second polarization in the beam B of optical radiation. The polarization diversity coupler 10 may be identical or similar to the polarization diversity coupler that is described in "A polarization-diversity wavelength duplexer circuit in silicon-on-insulator photonics wires" (W. Bogaerts et al., Vol. 15, No. 4, Optics Express 1568).

A first waveguide 21 is connected to the first output port O10a of the polarization diversity coupler 10 and receives the first portion R1 of the optical radiation. The first waveguide 21 guides the first portion R1 in a waveguide mode (e. g. TE-waveguide mode) that the first waveguide 21 provides.

A second waveguide 22 provides the same waveguide mode (e. g. TE-waveguide mode) as the first waveguide 21. The second waveguide 22 is connected to the second output port O10b of the polarization diversity coupler 10 and receives the second portion R2 of the optical radiation and guides the second portion R2 in said same waveguide mode (e. g. TE-waveguide mode).

A first phase shifter 31 is arranged in the first waveguide 21 and induces a phase shift in the first waveguide 21 in response to a first control signal CS1.

A 2×2 coupler 40 of the optical device 1 has a first input port 140a connected to the first waveguide 21 and a second input port 140b connected to the second waveguide 22. A first output port O40a of the 2×2 coupler 40 is connected to a first output waveguide 51. A second output port O40b of the 2×2 coupler 40 is connected to a second output waveguide 52. In the exemplary embodiment of FIG. 1, the 2×2 coupler 40 is an MMI coupler.

A first photodetector 61 is assigned to the first output waveguide 51 and detects (e.g. via a beam splitter 61a) a small portion (preferably less than 10%) of the radiation that is guided in the first output waveguide 51. The first photodetector 61 generates a first monitor signal M1.

A control unit 70 of the optical device 1 generates the first control signal CS1 based on the first monitor signal M1. More specifically, the control unit 70 generates the first control signal CS1 such that it yields a first monitor signal M1 that meets at least one condition.

In the exemplary embodiment of FIG. 1, the at least one condition requires that the amplitude of the first monitor signal M1 equals half, or at least half within a given tolerance, of the maximum amplitude that the first monitor signal M1 could adopt in response to an appropriate control signal.

The appropriate control signal may be determined by sweeping the phase shift from 0° to 360° and measure the resulting amplitude of the first monitor signal M1 as a function of the first control signal CS1.

In the exemplary embodiment of FIG. 1, the first phase shifter 31 may be a thermo-optical phase shifter comprising a heater. The first control signal CS1 is preferably an electrical signal that causes an electrical current through the heater. The heater may consist of or comprise metal or doped semiconductor material.

In the exemplary embodiment of FIG. 1, the optical device 1 may further comprise a first modulator 81 located between the first output port O40a of the 2×2 coupler 40 and a first output port O1a of the optical device 1. The optical device 1 may also comprise a second modulator 82 located between the second output port O40b of the 2×2 coupler 40 and a second output port O1b of the optical device 1.

The modulators 81 and 82 are preferably configured to modulate the radiation that they receive from the respective output port of the 2×2 coupler 40, in response to an individual electrical data signal DS1, DS2 that is applied to the respective modulator. The individual electrical data signals DS1, DS2 may comprise data streams.

In the exemplary embodiment of FIG. 1, the optical device 1 may further comprise a first beam deflecting element 91 between the first modulator 81 and the first output port O1a of the optical device 1, and a second beam deflecting element 92 between the second modulator 82 and the second output port O1b of the optical device 1.

The beam deflecting elements 91 and 92, the polarization diversity coupler 10, the first phase shifter 31, the 2×2 coupler 40, and the modulators 81 and 82 are preferably located in the same plane. The beam B received by the polarization diversity coupler 10 may be angled relative to said plane. The polarization diversity coupler 10 preferably deflects the beam B into the plane towards the 2×2 coupler 40.

The beam deflecting elements 91 and 92 are preferably configured to deflect the modulated radiation off the plane towards the respective output port O1a and O1b of the optical device 1. The output ports O1a and O1b of the optical device 1 are preferably outside said plane. Alternatively, the beam deflecting elements 91 and 92 may directly form the output ports O1a and O1b of the optical device 1.

Figure 2:
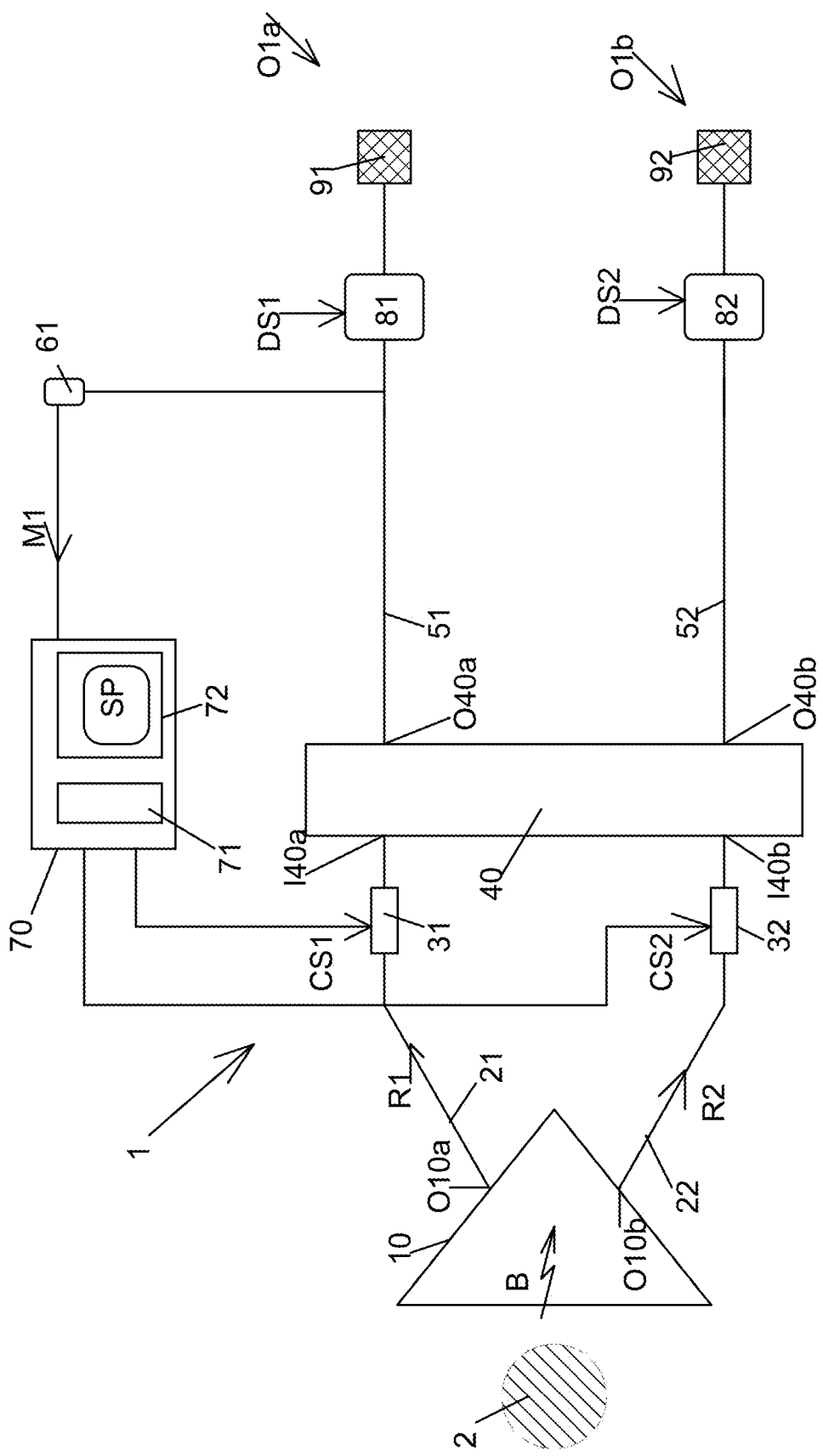

FIG. 2 shows a second exemplary embodiment of an optical device 1 according to the present invention. The optical device 1 comprises—in addition to the components described above with reference to FIG. 1—a second phase shifter 32 that is arranged in the second waveguide 22. The second phase shifter 32 may induce a phase shift in the second waveguide 22 in response to a second control signal CS2.

The control unit 70 generates the first and/or the second control signal CS1, CS2 based on the first monitor signal M1. The control unit 70 may select the first or the second phase shifter 31, 32 for phase shifting. Preferably, the control unit 70 chooses the phase shifter such that the abovementioned requirement or condition is met with the smallest phase shift and therefore the smallest amount of current and heat in the phase shifters.

The more suitable phase shifter 31 or 32 may be determined by sweeping the phase shift of the first and the second phase shifter 31, 32 from 0° to 360° (one after the other) and measure the resulting amplitude of the first monitor signal M1 as a function of the first and second control signal CS1, CS2. For instance, in a first step, the control signal CS1 that is required for meeting the abovementioned condition, may be determined by sweeping the phase shift of the first phase shifter 31 from 0° to 360° (with CS2=0). In a second step, the control signal CS2 that is required for meeting the abovementioned condition, may be determined by sweeping the phase shift of the second phase shifter 32 from 0° to 360° (with CS1=0). The phase shifter 31 or 32 that achieves the necessary phase shift (meets the required condition) with the smaller amount of current and heat will be chosen by the control unit 70 for further controlling the optical device 1.

In the exemplary embodiment of FIG. 2, the first phase shifter 31 and the second phase shifter 32 are preferably thermo-optical phase shifters having a heater that comprises or consists of metal and/or doped semiconductor material.

Figure 3:
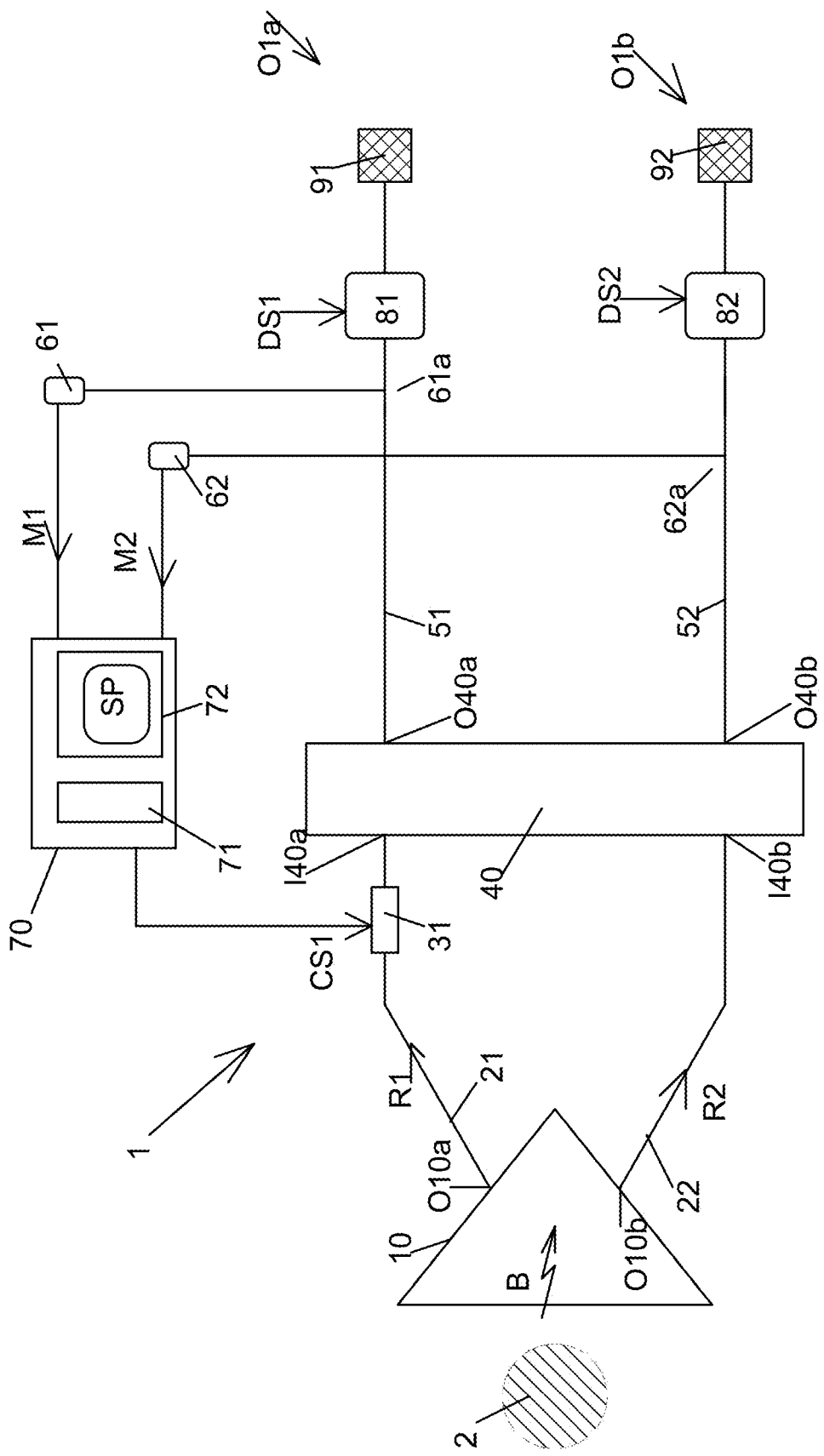

FIG. 3 shows a third exemplary embodiment of an optical device 1 according to the present invention. The optical device 1 comprises—in addition to the components described above with reference to FIG. 1—a second photodetector 62.

The second photodetector 62 is assigned to the second output waveguide 52 and detects (e.g. via a beam splitter 62a) a small portion (preferably less than 10%) of the radiation that is guided in the second output waveguide 52, and generates a second monitor signal M2 indicating the amount of the detected radiation.

The control unit 70 generates the first control signal CS1 based on the first and second monitor signal M1, M2. For instance, the control unit 70 may generate the first control signal CS1 such that it yields monitor signals M1 and M2 where the difference between the amplitudes of the two monitor signals M1 and M2 is minimal, or zero within a given tolerance.

Figure 4:
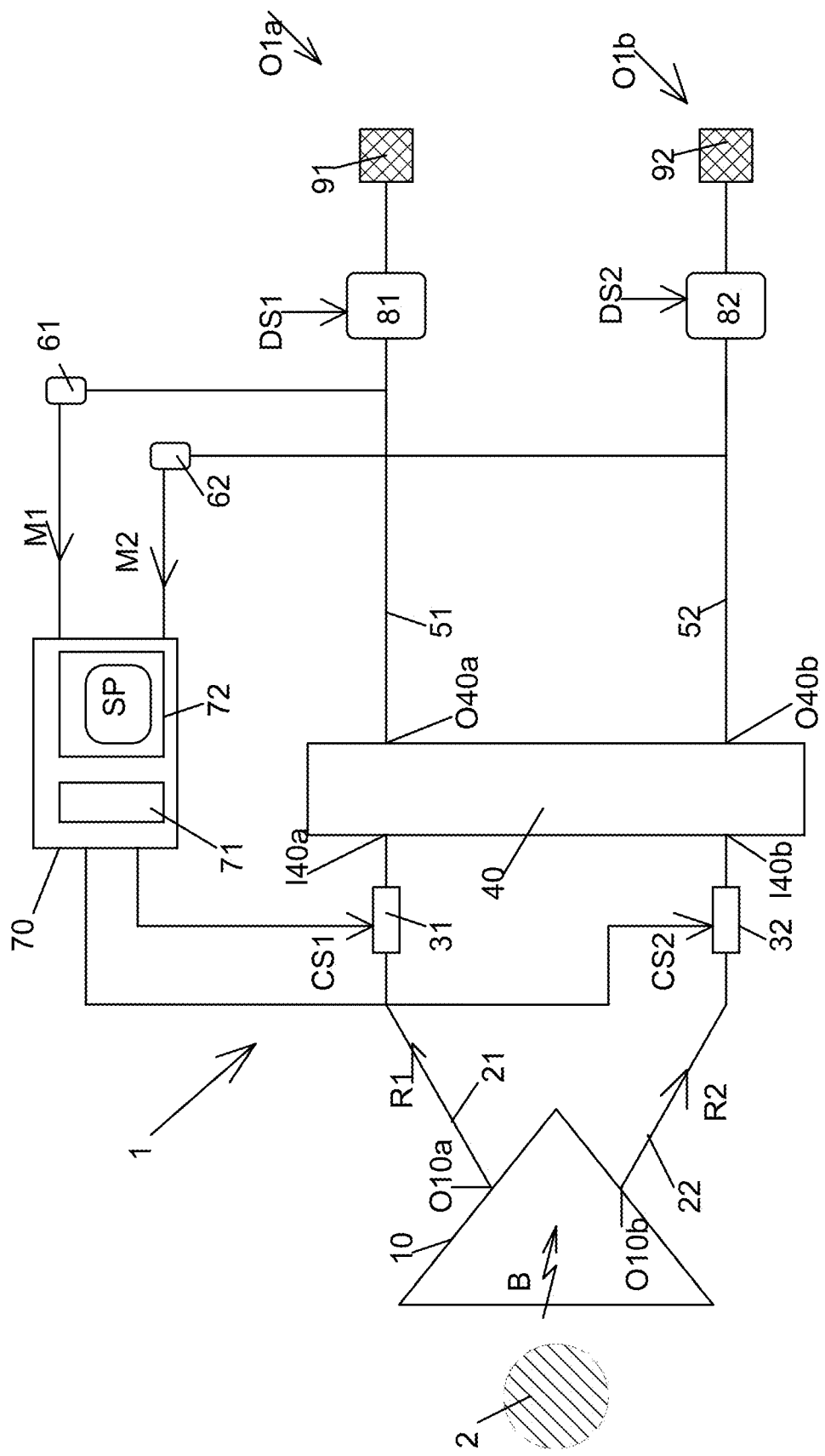

FIG. 4 shows a fourth exemplary embodiment of an optical device 1 according to the present invention. The optical device 1 comprises—in addition to the components described above with reference to FIG. 3—a second phase shifter 32 that is arranged in the second waveguide 22. The second phase shifter 32 may induce a phase shift in the second waveguide 22 in response to a second control signal CS2 as described above in detail with reference to FIG. 2.

In the exemplary embodiment of FIG. 4, the control unit 70 may generate the first and/or the second control signal CS1, CS2 based on the first and second monitor signal M1, M2. The control unit 70 may select the first or the second phase shifter 31, 32 for phase shifting. Preferably, the control unit 70 chooses the phase shifter such the abovementioned requirement or condition is met with the smallest phase shift and therefore the smallest amount of current and heat in the phase shifters.

Figure 5:
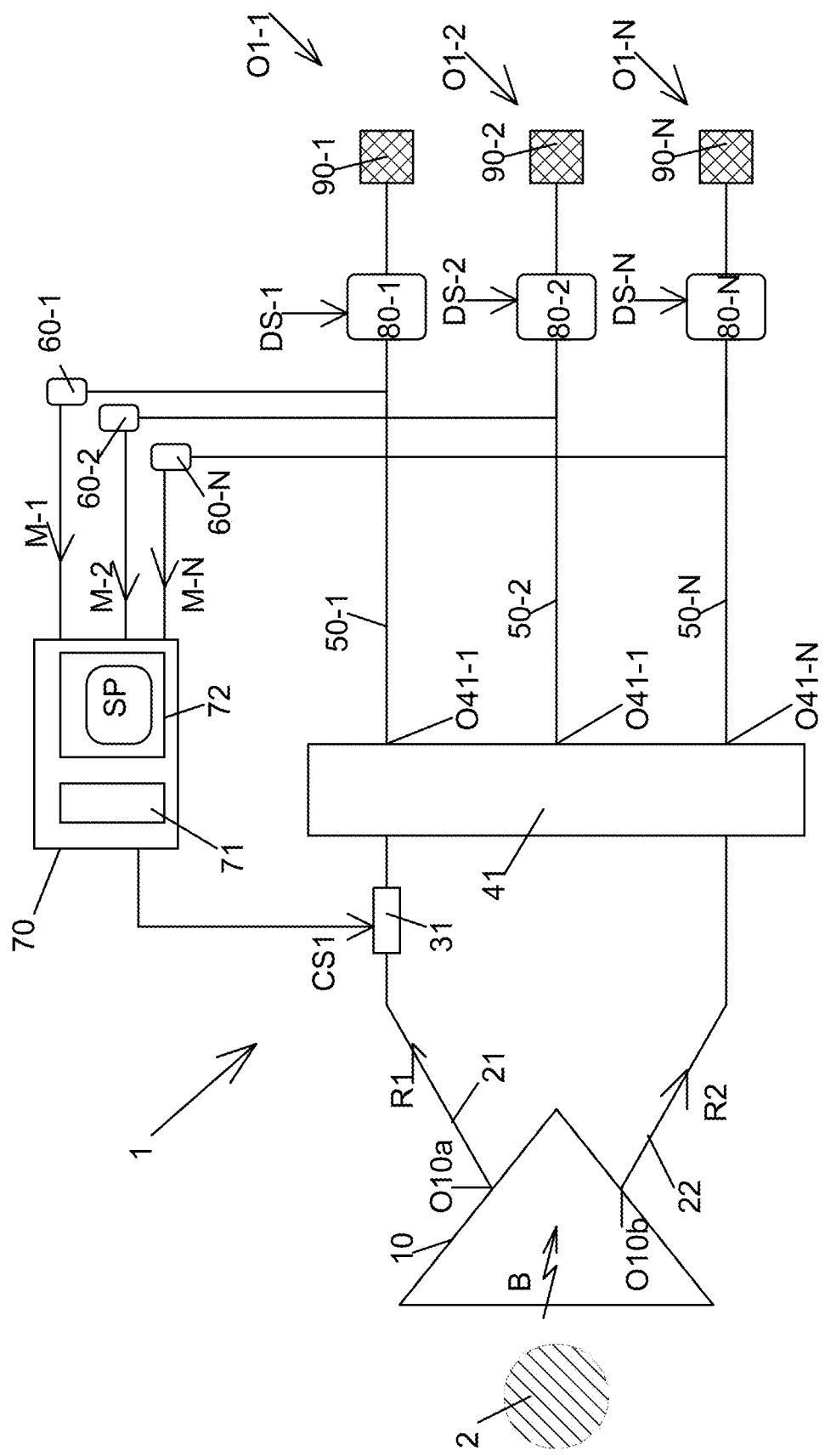

FIG. 5 shows a fifth exemplary embodiment of an optical device 1 according to the present invention. The optical device 1 comprises a 2×N coupler 41.

The coupler 41 comprises N output ports O41-1, O41-2 and O41-N, each of which is connected to an individually assigned output waveguide. For illustration purposes, FIG. 5 shows three output waveguides (N=3) that are designated by reference numerals 50-1, 50-2 and 50-N in an exemplary fashion. The embodiment of FIG. 5 may of course comprise more than three output waveguides (i.e. N>3).

Each of the output waveguides is (e.g. via a beam splitter) equipped with a photodetector 60-1, 60-2 and 60-N, a modulator 80-1, 80-2 and 80-N, and a beam deflecting element 90-1, 90-2 and 90-N.

Each modulator modulates the radiation in its respective output path in response to an individual electrical data signal DS-1, DS-2 and DS-N that is applied to its modulator. The electrical data signals DS-1, DS-2 and DS-N may comprise data streams.

Each of the photodetectors 60-1, 60-2 and 60-N generates a monitor signal M-1, M-2, M-N that indicates the amount of the detected radiation. The control unit 70 generates the first control signal CS1 for controlling the phase shift of the first phase shifter 31 based on the monitor signals M-1, M-2, M-N of the N photodetectors 60-1, 60-2 and 60-N.

Preferably, the control unit 70 generates the first control signal CS1 such that it yields monitor signals M-1, M-2, M-N indicating that the radiation guided in the N output waveguides 50-1, 50-2 and 50-N is equal or at least equal within a given tolerance.

The beam deflecting elements 90-1, 90-2 and 90-N, the polarization diversity coupler 10, the phase shifter 31, the 2×2 coupler 41 and the modulators 80-1, 80-2 and 80-N are preferably located in the same plane. The beam B received by the polarization diversity coupler 10 is preferably angled relative to said plane. The polarization diversity coupler 10 is preferably configured to deflect the beam B into the plane towards the 2×N coupler 41. Each beam deflecting element 90-1, 90-2 and 90-N is preferably configured to deflect the modulated radiation off the plane towards an assigned output port O1-1, O1-2, O1-1N of the optical device 1.

Figure 6:
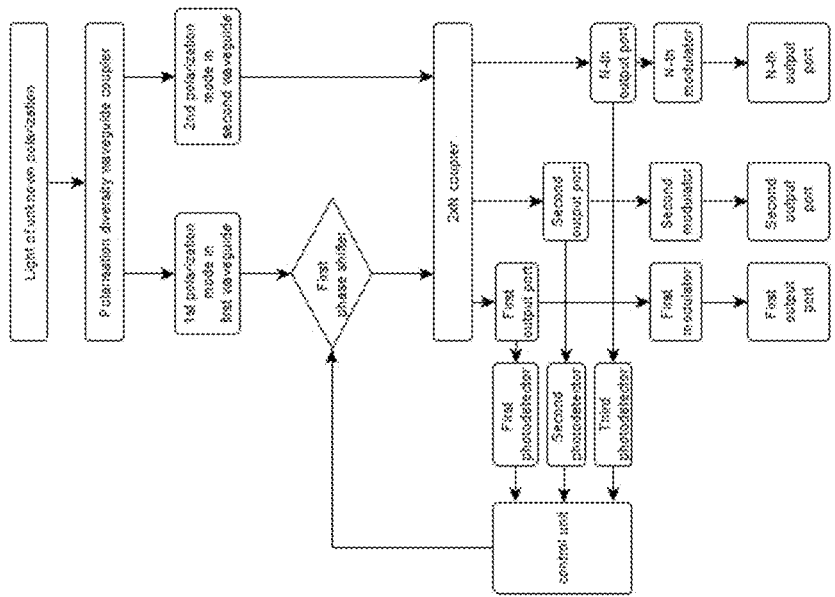
FIG. 6 a flow chart illustrating the functionality of the optical device of FIG. 5.

FIG. 6 shows a flow chart illustrating the described functionality of the optical device 1 of FIG. 5.

Figure 7:
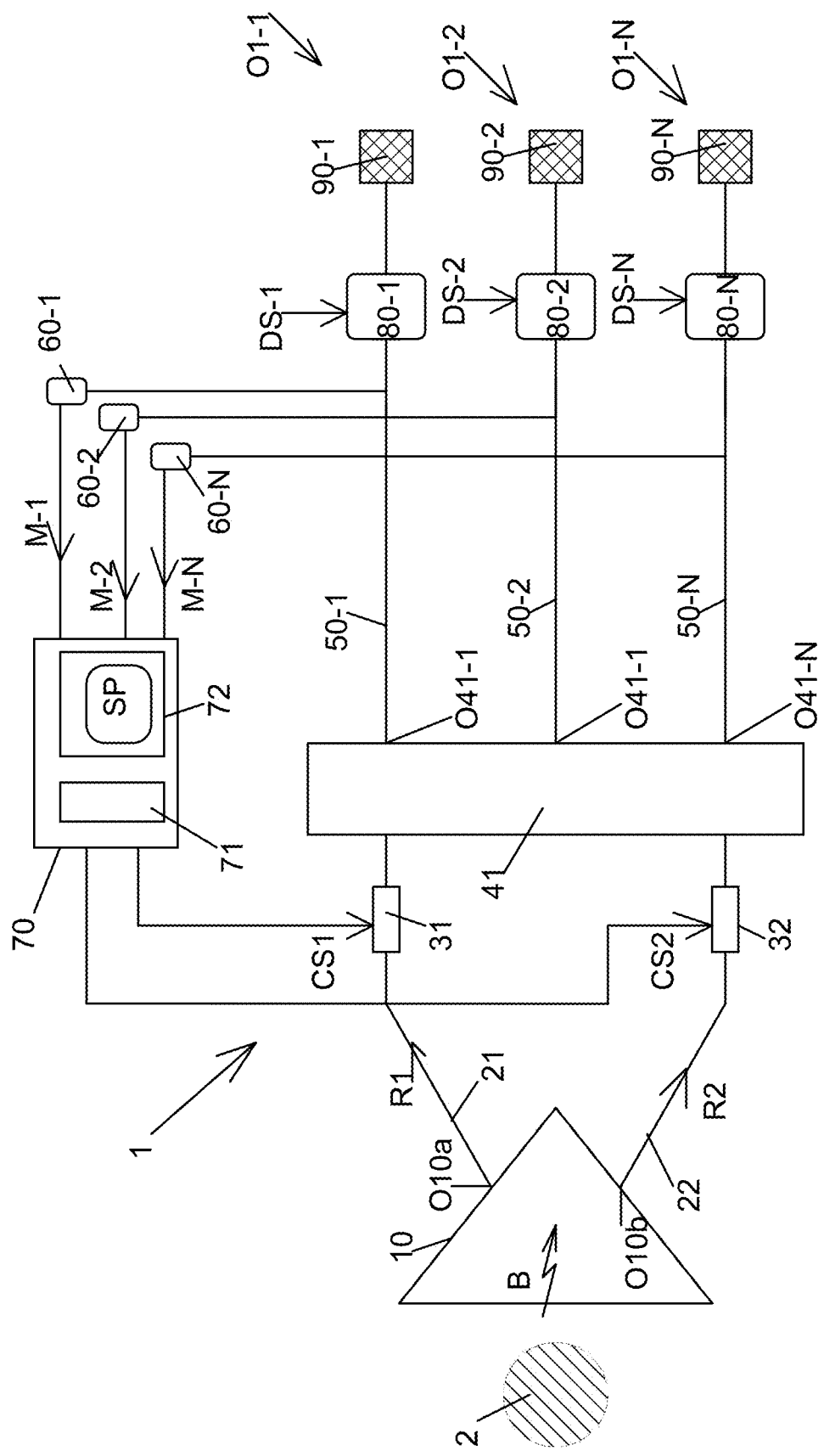
FIG. 7 illustrates another exemplary embodiment of an optical device comprising a single coupler.

FIG. 7 shows a sixth exemplary embodiment of an optical device 1 according to the present invention. The optical device 1 comprises a 2×N coupler 41 and is similar to the embodiment of FIG. 5. In contrast thereto, the embodiment of FIG. 7 also comprises a second phase shifter 32 as described with reference to FIGS. 2 and 4.

The second phase shifter 32 may induce a phase shift in the second waveguide 22 in response to a second control signal CS2. More specifically, the control unit 70 may generate the first and/or the second control signal CS1, CS2 based on the monitor signals M-1, M-2, M-N. The control unit 70 may select the first or the second phase shifter 32 for phase shifting. Preferably, the control unit 70 chooses the phase shifter such the abovementioned requirement of equal distribution in the output waveguides is met with the smallest phase shift and therefore the smallest amount of current and heat in the phase shifters.

Figure 8:
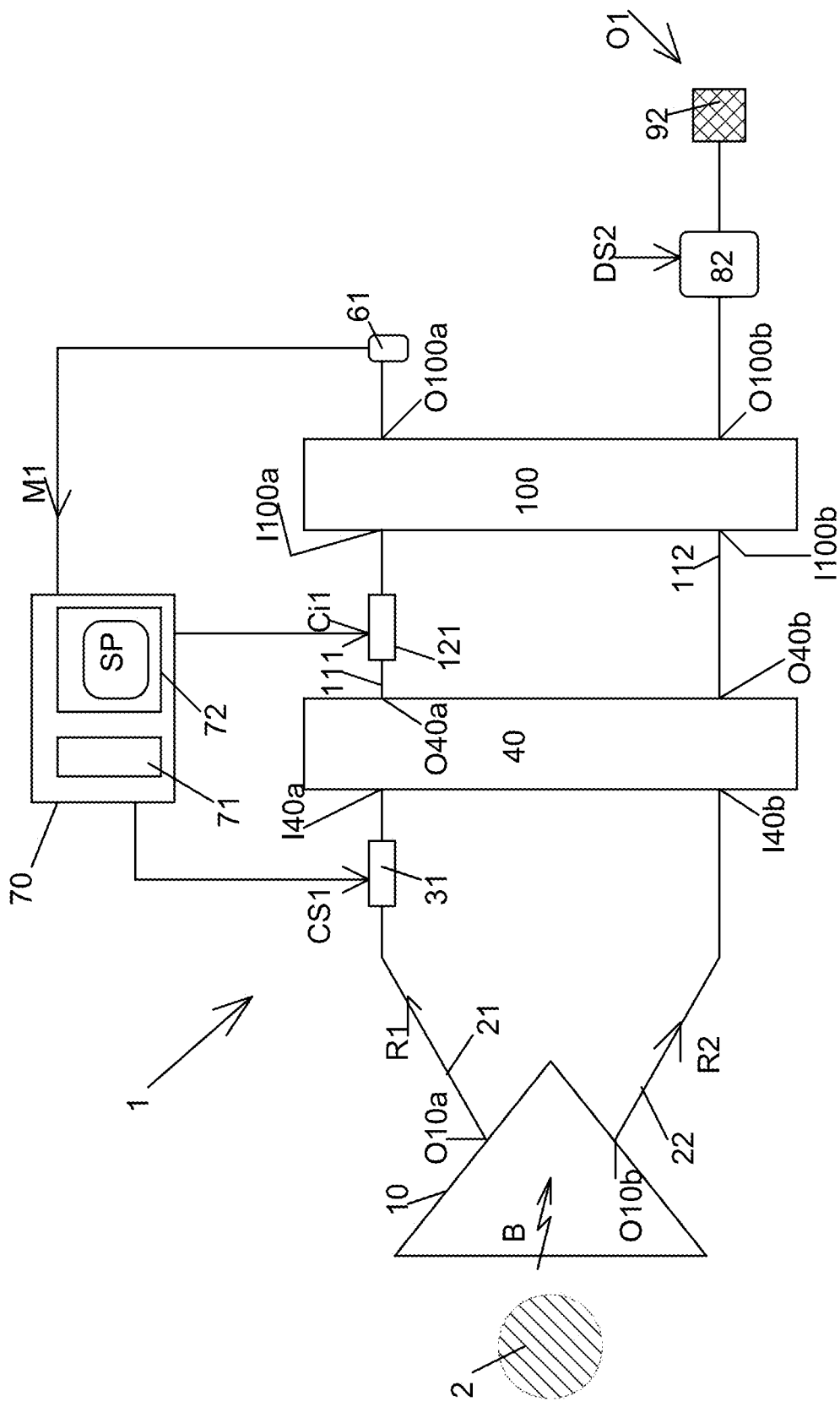
FIG. 8 illustrates an exemplary embodiment of an optical device comprising two couplers in series.

FIG. 8 shows a seventh exemplary embodiment of an optical device 1 according to the present invention. The optical device 1 of FIG. 8 is similar to the embodiment of FIG. 1 but comprises two 2×2 couplers, hereinafter referred to as first 2×2 coupler 40 and second 2×2 coupler 100.

A first output port O40a of the first 2×2 coupler 40 is connected to a first input port I100a of the second 2×2 coupler 100 via a third waveguide 111. A second output port O40b of the first 2×2 coupler 40 is connected to a second input port I100b of the second 2×2 coupler 40 via a fourth waveguide 112.

A first intermediate phase shifter 121 is arranged in the third waveguide 111 and configured to induce a phase shift in the third waveguide 111 in response to a first intermediate control signal Ci1.

A first photodetector 61 detects a portion (preferably all) of the radiation that is outputted at the first output port O100a of the second 2×2 coupler 100. A second output port O100b of the second 2×2 coupler 100 is connected to an output port O1 of the optical device 1.

Preferably, the optical device 1 further comprises a modulator 82 located between the second output port O100b of the second 2×2 coupler 100 and the output port O1 of the optical device 1. The modulator 82 may be configured to modulate the radiation that it receives from the second output port O100b of the second 2×2 coupler 100, in response to an electrical data signal DS2 that is applied to the modulator and may comprise a data stream.

The optical device 1 may also comprise a beam deflecting element 92 between the modulator 82 and the output port O1 of the optical device 1. The beam deflecting element 92, the polarization diversity coupler 10, the 2×2 couplers 40 and 100, the phase shifters 31 and 111 and the modulator 82 are preferably located in the same plane. The beam B received by the polarization diversity coupler 10 may be angled relative to said plane. The polarization diversity coupler 10 may be configured to deflect the beam B into the plane towards the 2×2 coupler 40. The beam deflecting element 92 may be configured to deflect the modulated radiation off the plane towards the output port O1 of the optical device 1.

The control unit 70 is preferably configured to generate the first control signal CS1 and the first intermediate control signal Ci1 based on the first monitor signal M1. The control unit 70 may generate the first control signal CS1 and the first intermediate control signal Ci1 such that they yield a first monitor signal M1 meeting the condition (requirement) that the radiation outputted at the first output port O100a of the second 2×2 coupler 100 is minimal or zero within a given tolerance.

Figure 9:
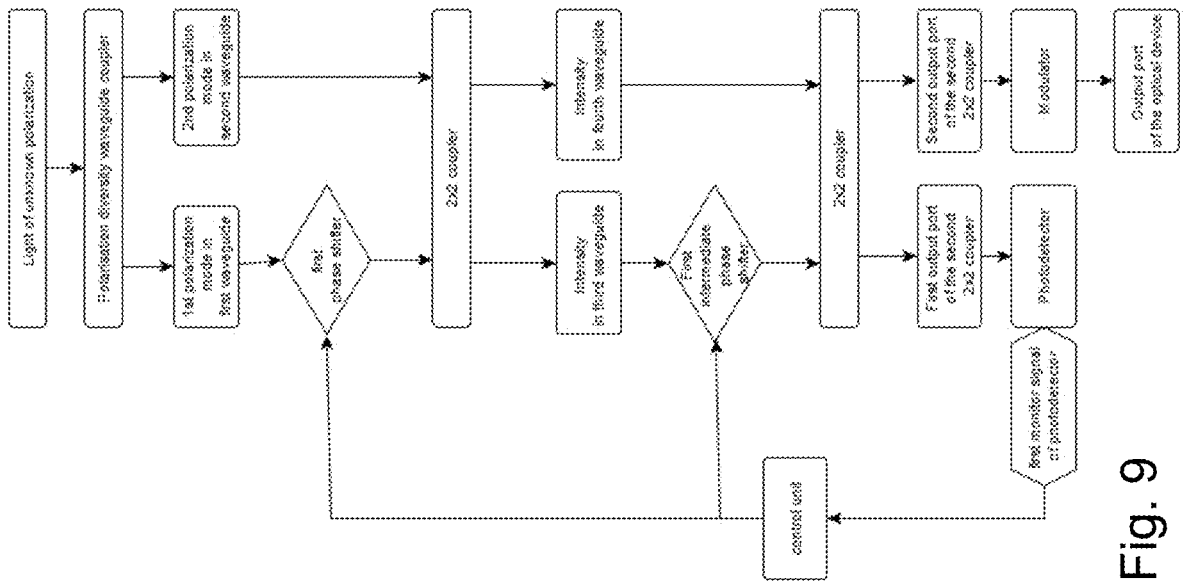
FIG. 9 a flow chart illustrating the functionality of the optical device of FIG. 8.

FIG. 9 shows a flow chart illustrating the described functionality of the optical device 1 of FIG. 8.

Figure 10:
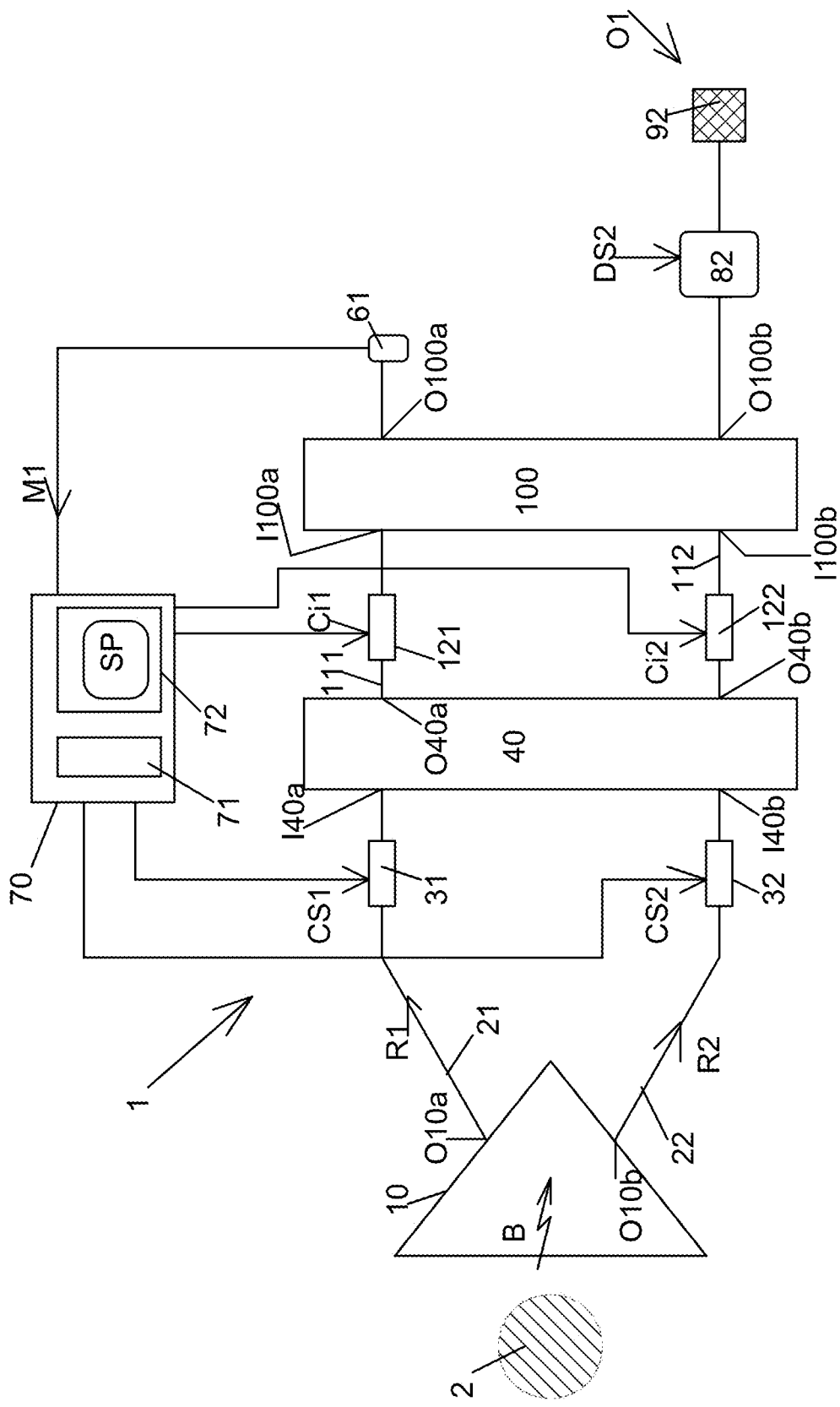
FIG. 10 illustrates another exemplary embodiment of an optical device comprising two couplers in series.

FIG. 10 shows an eighth exemplary embodiment of an optical device 1 according to the present invention. The optical device 1 comprises—in addition to the components described above with reference to FIG. 8—a second phase shifter 32 that is arranged in the second waveguide 22 and a second intermediate phase shifter 122. The second phase shifter 32 may induce a phase shift in the second waveguide 22 in response to a second control signal CS2. The second intermediate phase shifter 122 may induce a phase shift in the second intermediate waveguide 112 in response to a second intermediate control signal Ci2.

The control unit 70 generates the control signals CS1, CS2, Ci1, Ci2 based on the first monitor signal M1. The control unit 70 preferably determines and thereafter applies the control signals CS1, CS2, Ci1, Ci2 such that (a) the first monitor signal M1 becomes minimal or zero within a given tolerance and (b) the entire energy or current consumption that is required by the four phase shifters 31, 32, 121 and 122 in order to achieve requirement (a) is minimal.

The appropriate control signals can be found be varying the CS1, CS2, Ci1, Ci2 relatively to one another and monitoring the first monitor signal M1.

In the exemplary embodiment of FIG. 10, the first phase shifter 31 and the second phase shifter 32 are preferably thermo-optical phase shifters that may have a heater that comprises or consists of metal or doped semiconductor material.

The control units 70 shown or referred to in FIGS. 1-10 preferably comprises a processor 71 and a memory 72. The memory 72 stores a software program SP that, when carried out by the processor 71, enables the control unit 70 to generate the control signals as explained above with reference to FIGS. 1-10.

The length L of the MMI couplers 40, 41 and 100 shown or referred to in FIGS. 1-10, is preferably determined as follows:

$$L = \frac{3\pi}{2(\beta 0 - \beta 1)}$$

where β0 describes the propagation coefficient of the first mode that can propagate in the MMI, and β1 describes the propagation coefficient of the second mode that can propagate in the MMI.

The modulators 81 and 82 may be any type of optical modulators (e.g. phase modulators, amplitude modulators, polarization modulators, injection modulators, depletion modulators, etc. . . . ) and they may be operated by any type of driving scheme (e.g. segmented driver, travelling-wave electrode, segmented travelling-wave electrode, etc. . . . ).

The various embodiments and aspects of embodiments of the invention disclosed herein are to be understood not only in the order and context specifically described in this specification, but to include any order and any combination thereof. Whenever the context requires, all words used in the singular number shall be deemed to include the plural and vice versa. Whenever the context requires, all options that are listed with the word "and" shall be deemed to include the world "or" and vice versa, and any combination thereof.

In the drawings and specification, there have been disclosed a plurality of embodiments of the present invention. The applicant would like to emphasize that each feature of each embodiment may be combined with or added to any other of the embodiments in order to modify the respective embodiment and create additional embodiments. These additional embodiments form a part of the present disclosure and, therefore, the applicant may file further patent claims regarding these additional embodiments at a later stage of the prosecution.

Further, the applicant would like to emphasize that each feature of each of the following dependent claims may be combined with any of the present independent claims as well as with any other (one or more) of the present dependent claims (regardless of the present claim structure).

Therefore, the applicant may direct further patent claims towards other claim combinations at a later stage of the prosecution.

The invention claimed is:

1. An optical device comprising
a polarization diversity coupler configured to receive a beam of optical radiation having a first polarization, a second polarization perpendicular to the first polarization or a mixture of both the first and second polarization, the polarization diversity coupler comprising a first output port for outputting a first portion of the optical radiation that featured the first polarization in said beam of optical radiation, and a second output port for outputting a second portion of the optical radiation that featured the second polarization in said beam of optical radiation,
a first waveguide connected to the first output port of the polarization diversity coupler and configured to receive the first portion of the optical radiation and guide the first portion in a waveguide mode provided by the first waveguide,
a second waveguide that provides the same waveguide mode as the first waveguide, wherein the second waveguide is connected to the second output port of the polarization diversity coupler and configured to receive the second portion of the optical radiation and guide the second portion in said same waveguide mode,
a first phase shifter arranged in the first waveguide and configured to induce a phase shift in the first waveguide in response to a first control signal,
a 2×N coupler having a first input port connected to the first waveguide, a second input port connected to the second waveguide and two or more output ports, a first photodetector configured to detect at least a portion of the radiation that passes the 2×N coupler, and to generate a first monitor signal that indicates the amount of the detected radiation, and
a control unit configured to generate the first control signal based on the first monitor signal,
wherein the 2×N coupler comprises N output ports, each of which is connected to an individually assigned output waveguide, and a plurality of photodetectors, one which is said first photodetector,
wherein each of the photodetectors is individually assigned to one of the output waveguides, wherein each of the photodetectors is configured to detect at least a portion of the radiation that is guided in its individually assigned output waveguide, wherein each of the photodetectors is configured to generate a monitor signal indicating the amount of the detected radiation, and wherein the control unit is configured to generate the first control signal based on the monitor signals of said N photodetectors, wherein the control unit is configured to generate the first control signal such that it yields monitor signals meeting at least one condition, wherein the at least one condition includes a requirement that the radiation guided in the N output waveguides is equal or at least equal within a given tolerance, wherein each of the output ports of the 2×N coupler is connected to an assigned output port of the optical device via an output path, wherein at least one modulator is located in each output path, and wherein each modulator is configured to modulate the radiation in its respective output path in response to an electrical data signal that is applied to the modulator and comprises a data stream.

2. Optical device of claim 1 wherein the optical device comprises a beam deflecting element in each output path, wherein the beam deflecting elements, the polarization diversity coupler, the phase shifter and the modulators are located in the same plane, wherein the beam received by the polarization diversity coupler is angled relative to said plane, wherein said polarization diversity coupler is configured to deflect the beam into the plane towards the 2×N coupler, and wherein each beam deflecting element is configured to deflect the modulated radiation off the plane towards the assigned output port of the optical device.

3. Optical device of claim 1 wherein a second phase shifter is arranged in the second waveguide and configured to induce a phase shift in the second waveguide in response to a second control signal, and wherein the control unit is configured to generate the first and second control signal based on the first monitor signal.

4. Optical device of claim 1 wherein the 2×N coupler is an MMI coupler.

5. Optical device of claim 1 wherein the first phase shifter is a thermo-optical phase shifter comprising a heater that comprises or consists of metal.

6. Optical device of claim 1 wherein the first phase shifter is a thermo-optical phase shifter comprising a heater that comprises or consists of doped semiconductor material.

7. Optical device of claim 1 wherein the 2×N coupler is a 2×2 coupler comprising a first output port and a second output port, wherein the first output port of the 2×2 coupler is connected to a first output waveguide, and the second output port of the 2×2 coupler is connected to a second output waveguide, wherein the first photodetector is assigned to the first output waveguide and configured to detect at least a portion of the radiation that is guided in the first output waveguide, and to generate a first monitor signal indicating the amount of the detected radiation, and wherein the control unit is configured to generate the first control signal such that it yields a first monitor signal meeting at least one condition.

8. Optical device of claim 7 wherein the at least one condition includes a requirement that the amplitude of the first monitor signal equals half, or at least half within a given tolerance, of a maximum amplitude that the first monitor signal could adopt in response to an appropriate control signal.

9. Optical device of claim 7 wherein the optical device comprises a second photodetector, the first output port of the 2×2 coupler is connected to a first output waveguide, and the second output port of the 2×2 coupler is connected to a second output waveguide, wherein the first photodetector is assigned to the first output waveguide and configured to detect at least a portion of the radiation that is guided in the first output waveguide, and to generate a first monitor signal indicating the amount of the detected radiation, wherein the second photodetector is assigned to the second output waveguide and configured to detect at least a portion of the radiation that is guided in the second output waveguide, and to generate a second monitor signal indicating the amount of the detected radiation, and wherein the control unit is configured to generate the first control signal based on the first and second monitor signal.

10. Optical device of claim 9 wherein the control unit is configured to generate the first control signal such that it yields monitor signals meeting at least one condition, and wherein the at least one condition includes a requirement that the difference between the amplitudes of the two monitor signals is minimal, or zero within a given tolerance.

11. Optical device of claim 10 wherein a second phase shifter is arranged in the second waveguide and configured to induce a phase shift in the second waveguide in response to a second control signal, and wherein the control unit is configured to generate the first and second control signal based on the first and second monitor signal.

12. Optical device of claim 7 wherein a second phase shifter is arranged in the second waveguide and configured to induce a phase shift in the second waveguide in response to a second control signal, and wherein the control unit is configured to generate the first and second control signal based on the first monitor signal.

13. Optical device of claim 7 wherein the 2×2 coupler is an MMI coupler or a directional coupler.

14. An optical device comprising a polarization diversity coupler configured to receive a beam of optical radiation having a first polarization, a second polarization perpendicular to the first polarization or a mixture of both the first and second polarization, the polarization diversity coupler comprising a first output port for outputting a first portion of the optical radiation that featured the first polarization in said beam of optical radiation, and a second output port for outputting a second portion of the optical radiation that featured the second polarization in said beam of optical radiation, a first waveguide connected to the first output port of the polarization diversity coupler and configured to receive the first portion of the optical radiation and guide the first portion in a waveguide mode provided by the first waveguide, a second waveguide that provides the same waveguide mode as the first waveguide, wherein the second waveguide is connected to the second output port of the polarization diversity coupler and configured to receive the second portion of the optical radiation and guide the second portion in said same waveguide mode, a first phase shifter arranged in the first waveguide and configured to induce a phase shift in the first waveguide in response to a first control signal, a 2×N coupler having a first input port connected to the first waveguide, a second input port connected to the second waveguide and two or more output ports, a first photodetector configured to detect at least a portion of the radiation that passes the 2×N coupler, and to generate a first monitor signal that indicates the amount of the detected radiation, and a control unit configured to generate the first control signal based on the first monitor signal, wherein the 2×N coupler is a first 2×2 coupler having a first and a second output port, wherein the first output port of the first 2×2 coupler is connected to a first input port of a second 2×2 coupler via a third waveguide, wherein the second output port of the first 2×2 coupler is connected to a second input port of a second 2×2 coupler via a fourth waveguide, wherein a first intermediate phase shifter is arranged in the third waveguide and configured to induce a phase shift in the third waveguide in response to a first intermediate control signal, wherein the first photodetector is configured to detect at least a portion of the radiation that also passes the second 2×2 coupler, and wherein the control unit is configured to generate the first control signal and the first intermediate control signal based on the first monitor signal, wherein the control unit is configured to generate the first control signal and the first intermediate control signal such that they yield a first monitor signal meeting at least one condition, wherein the at least one condition includes a requirement that the radiation outputted at a first output port of the second 2×2 coupler is minimal or zero within a given tolerance, and wherein a second output port of the second 2×2 coupler is connected to an output port of the optical device, wherein the optical device comprises a modulator located between the second output port of the second 2×2 coupler and the output port of the optical device and wherein the modulator is configured to modulate the radiation that it receives from the second output port of the second 2×2 coupler, in response to an electrical data signal that is applied to the modulator and comprises a data stream.

15. Optical device of claim 14
wherein the optical device comprises a beam deflecting element between the modulator and the output port of the optical device, wherein the beam deflecting element, the polarization diversity coupler, the couplers, the phase shifter and the modulator are located in the same plane, wherein the beam received by the polarization diversity coupler is angled relative to said plane, wherein said polarization diversity coupler is configured to deflect the beam into the plane towards the 2×2 coupler, and wherein said beam deflecting element is configured to deflect the modulated radiation off the plane towards the output port of the optical device.

16. Optical device of claim 14
wherein the first and/or second 2×2 coupler is an MMI coupler or a directional coupler.

* * * * *